Patented July 1, 1941

2,247,913

UNITED STATES PATENT OFFICE 2,247,913

CONDENSATION PRODUCT OF 4-(4' AMINO BENZENE SULPHONAMIDO) - BENZENE SULPHONAMIDE WITH AN ALDOSE

Josef Klarer, Wuppertal-Elberfeld, Germany, assignor, by mesne assignments, to Alba Pharmaceutical Company, Inc., New York, N. Y., a corporation of New York No Drawing. Application August 30, 1939, Serial No. 292,604. In Germany September 1, 1938

9 Claims. (Cl. 260—211)

The present invention relates to condensation products and to a process of preparing the same.

Compounds being readily soluble with neutral reaction and being active against bacterial infections, especially against gonococci are obtained when reacting 4-(4'-aminobenzenesulphonamido) - benzenesulphonic acid amides with aldoses of the mono- or polysaccharide series.

The 4-(4'-aminobenzenesulphonamido)-benzenesulphonic acid amides used as starting material may be substituted in the sulphonic acid amide group standing in the external position once or twice, for instance by alkyl or hydroxyalkyl groups. The benzene nucleus bound to this sulphonic acid amide group may also bear substituents such as halogen atoms, alkyl, hydroxyl or alkoxy groups. The said starting products, for instance, may be prepared according to our application for Letters Patent Ser. No. 122,984, filed January 29, 1937.

Glucose, arabinose, mannose, galactose, for instance, and particularly also aldobioses, such as maltose and lactose, come into consideration as aldoses. The reaction preferably takes place in the presence of a suitable solvent, such as methanol, ethanol or propanol and while heating until the reaction mixture has become completely soluble in water. For accelerating the reaction preferably a suitable catalyst is added. Ammonium halides, for instance ammonium chloride, hydrogen halide (in the form of gas or in concentrated aqueous solution) or hydrogen halides of the sulphonic acid amides used as starting materials have proved especially suitable. Sometimes the addition of pyridine to the reaction mixture has also proved to be advantageous.

The condensation products obtained may be injected subcutaneously, intraveneously or intramuscularly without causing irritation. Even high dosages do not have any by-effect. They are, therefore, especially suitable for the therapeutic treatment of bacterial infectious diseases, especially of the gonorrhoea, by injection.

The invention is illustrated by the following examples without being restricted thereto:

Example 1

32.7 grams of 4-(4'-aminobenzenesulphonamido)-benzenesulphonic acid amide are heated to boiling under reflux with 18 grams of d-glucose and 3-4 drops of concentrated hydrochloric acid in 250 grams of methanol for 5 to 6 hours. The 4-(4'-aminobenzenesulphonamido)-benzenesulphonic acid amide thereupon gradually dissolves and when treating the reaction solution with water no precipitation takes place any more. After filtration the main quantity of the methanol is evaporated and the condensation product of glucose with 4-(4'-aminobenzenesulphonamido)-benzenesulphonic acid amide precipitated by means of ether as a white powder, it is sucked off and washed with acetone and at last with ether. The new compound is readily soluble in water, not as readily in ethanol and insoluble in ether.

In a corresponding manner when reacting 4-(4'-aminobenzenesulphonamido)-benzenesulphonic acid amide with mannose, galactose or maltose, condensation products are obtained in the form of white powders, being readily soluble in water with neutral reaction. Water-soluble condensation products are also obtained when reacting maltose upon 2-methyl-5-methoxy-4-(4' - aminobenzenesulphonamido) - benzenesulphonamide or upon 4-(4'-aminobenzenesulphonamido)- benzenesulphon - hydroxyethylamide or -bis-hydroxyethylamide in the above described manner.

Example 2

33.9 grams of 4-(4'-aminobenzenesulphonamido)-benzenesulphonic acid - mono - methylamide are heated to boiling under reflux with 34.2 grams of maltose and 0.2 gram of ammonium-chloride in 250 g. of methanol for 6 hours. After working up the mixture as described in Example 1, a condensation product is obtained as a white powder being soluble in water, but difficultly soluble in ether and acetone.

When using glucose instead of maltose a product is obtained being likewise readily soluble in water.

Example 3

35.5 grams of 4-(4'-aminobenzenesulphonamido)-benzenesulphonic acid dimethylamide are suspended with 34.2 grams of maltose in 250 grams of methanol. A trace of dry hydrochloric gas is introduced into the suspension. The reaction mixture is heated under reflux for about 6 hours and worked up as described in Example 1. The product thus obtained is readily soluble in water.

Instead of maltose also glucose can be used in a corresponding quantity.

I claim:

1. A condensation product of an aldose with a 4-(4'-aminobenzenesulphonamido)-benzenesulphonamide, which product is soluble in water.

2. A condensation product of an aldobiose with a 4-(4'-aminobenzenesulphonamido)-benzenesulphonamide, which product is soluble in water.

3. A condensation product of maltose with a 4-(4'-aminobenzenesulphonamido)-benzenesulphonamide, which product is soluble in water.

4. The process which comprises reacting upon a 4-(4'-aminobenzenesulphonamido)-benzenesulphonamide with an aldose in the presence of a lower aliphatic alcohol and a catalyst selected from the group consisting of ammonium halides, hydrogenhalides and hydrogenhalides of the 4-(4'-aminobenzenesulphonamido)-benzenesulphonamide used as starting material.

5. The process which comprises reacting upon a 4-(4'-aminobenzenesulphonamido)-benzenesulphonamide with an aldobiose in the presence of a lower aliphatic alcohol and a catalyst selected from the group consisting of ammonium halides, hydrogenhalides and hydrogenhalides of the 4-(4'-aminobenzenesulphonamido)-benzenesulphonamide used as starting material.

6. The process which comprises reacting upon a 4-(4'-aminobenzenesulphonamido)-benzenesulphonamide with maltose in the presence of a lower aliphatic alcohol and a catalyst selected from the group consisting of ammonium halides, hydrogenhalides and hydrogenhalides of the 4-(4'-aminobenzenesulphonamido)-benzenesulphonamide used as starting material.

7. The process which comprises reacting upon a 4-(4'-aminobenzenesulphonamido)-benzenesulphonamide with an aldose in the presence of a lower aliphatic alcohol and of ammonium chloride as a catalyst.

8. The process which comprises reacting upon a 4-(4'-aminobenzenesulphonamido)-benzenesulphonamide with an aldobiose in the presence of a lower aliphatic alcohol and of ammonium chloride as a catalyst.

9. The process which comprises reacting upon a 4-(4'-aminobenzenesulphonamido)-benzenesulphonamide with maltose in the presence of a lower aliphatic alcohol and of ammonium chloride as a catalyst.

JOSEF KLARER.